United States Patent [19]

Grushow

[11] 3,767,862

[45] Oct. 23, 1973

[54] TELEPHONE-CONSUMER MESSAGE UNITS COMPUTER

[76] Inventor: Gerald Grushow, 14 Dartmouth Dr., Plainview, N.Y. 11803

[22] Filed: Apr. 5, 1972

[21] Appl. No.: 241,230

[52] U.S. Cl. .............................................. 179/7.1 R
[51] Int. Cl. .......................................... H04m 15/18
[58] Field of Search ......................... 179/7.1 R, 7 R; 335/30, 33

[56] References Cited

UNITED STATES PATENTS

| | | | |
|---|---|---|---|
| 2,911,144 | 11/1959 | Lee et al. | 179/7.1 R |
| 2,598,244 | 5/1952 | Fasser | 179/7.1 R |
| 2,073,756 | 3/1937 | Sacken | 179/7.1 R |
| 3,538,258 | 10/1970 | Zuckerman | 179/7.1 R |
| 2,094,060 | 9/1937 | Busch | 179/7.1 R |

*Primary Examiner*—Kathleen H. Claffy
*Assistant Examiner*—Kenneth D. Baugh
*Attorney*—William T. Hough et al.

[57] ABSTRACT

A device utilizable by a person desiring to maintain a personal reasonably accurate record of a business-month's billing as based on message-unit rates, on the non-long distance areas telephone in or into, the number of telephone calls made from the particular telephone, in a preferred embodiment including a constant rate motor and driven shaft having pre-programmed different numbers of slots located at different distances from the shaft end, with a contact ridable along the rounded shaft and registerable of a charge upon dropping into a slot, and also initially registerable of a predetermined charge when being initially moved to and aligned with a particular rate position selected by the telephone user on getting through a telephone call, the charges being cumulatively registered until manually reset to zero.

4 Claims, 21 Drawing Figures

PATENTED OCT 23 1973 3,767,862

SHEET 2 OF 3

TELEPHONE-CONSUMER MESSAGE UNITS COMPUTER

This invention relates to a home or business office consumer telephone-bill message-unit computer.

BACKGROUND OF THE INVENTION

Prior to the present invention, there has been no reasonably accurate, durable and inexpensive computer device of exceptional simplicity for use and operation by persons of average and below average mental acuity, calculatable of either or both total message units utilized by a particular telephone since the beginning of the billing-date month, for non-long distance calls. As is known by some, and little-known by others, for any non-long distance call, depending upon how distant the "call made" is from the dialing telephone, the initial "message units" charge for the first three to five minutes varies, being a greater charge in an area more distant than the immediate vicinity. Because of the difference in initial charges for several "local" areas of varying distances, the overall charge is not linear and thus subject to large error on a strictly linear counter or timer. Yet, to become more accurate has constituted problems of complexity of structure, and/or complexity of operation, as well as lack of adaptability to differing systems such as Pacific Bell, New York City, and the like. By a consumer being aware of how close the total message units and/or dollar charge is to the maximum regular-rate billing units and/or charge, the consumer may avoid exceeding that maximum at all or at least to a large unrecognized extent, thereby avoiding unexpected excessive telephone billings. Not only is such a unit desired by and desirable for individual and business consumers (telephone users), but the telephone companies by its promotion could enhance public relations by helping the consumer understand and expect large bills, and additionally the telephone companies could promote such devices and/or service as an additional salable item and/or service by the telephone company.

SUMMARY OF THE INVENTION

It is an object of the present invention to overcome one or more of the above-noted needs, problems, and difficulties.

Another object, in particular, is to obtain a device easily operated by a typical housewife or secretary, for maintaining a close approximation of monthly-local-call billings for that month.

Another object is to obtain a message unit device having for a number of calls an average duration of (length of) conversation per call, a high level of accuracy.

Another object is to obtain a message unit calculator having about equally a high degree of accuracy as an average of a plurality of telephone dialings for all of several different local areas having different initial message unit charges.

Another object is to obtain a message unit calculator easily adaptable to different message unit charges and/or to different dollar charges per telephone message unit, in different telephone systems and/or in different parts of the country.

Other objects become apparent from the preceding and following disclosure.

One or more objects of the invention are obtained by the invention as described herein.

Broadly the inventive computer device may be defined as an initial message-unit input and rate selector and signal activator in combination with a linear constant-rate signal-activator for each of several differing initial inputs and differing linear constant rates, and with a manually resettable counter for registering and maintaining a cumulative total of all charges accumulating over a series of telephone dialing (or voice giving of number) throughout the billing month for the telephone company. By manual reset is meant any mechanical or electrical resetter which resets the counter to zero when the reset is physically activated by a telephone user. Although a spring-biased motor such as that of a spring-wound clock may be utilized as a constant predetermined speed motor for driving preprogrammed shaft(s) and/or wheel(s), a constant speed motor is preferred, as thus all preferred models are at least partially electrical. Similarly, although electronic embodiments of the invention are illustrated, it is preferred to utilize a predominantly mechanical embodiment having an electric constant speed motor because of the greater durability to wear of this embodiment together with its adaptability to modification for different telephone billing systems and differing rates, rate changes, and the like. The charge reflected by the counter is preferably at least in terms of message units, but may be in terms of dollars, or may include additionally a dollar indicator connected with the counter mechanism. Also, there may be a timer, a stop-watch, and/or regular electric clock included, and in a preferred embodiment the electric clock provides the constant rate predetermined-speed motor for revolving a preferred programmed shaft or shaft mounted wheels. For the dollar indicator, preferably the dollar chart is in the form of an annular chart having the dollar designations carried on the face thereof at the appropriate points reflecting the going-rate charges; a dollar rate change requires only a new annular chart.

In an embodiment having a clock as the constant speed motor, there is no need for an on-off switch.

In other embodiments having another type of constant speed motor, an off-on switch might be desirable, preferably turned on and off by manual movement of the rate selector lever (arm).

The invention may be better understood by making reference to the following figures.

THE FIGURES

DETAILED DESCRIPTION

Figures 1, 2, 2A, 3:
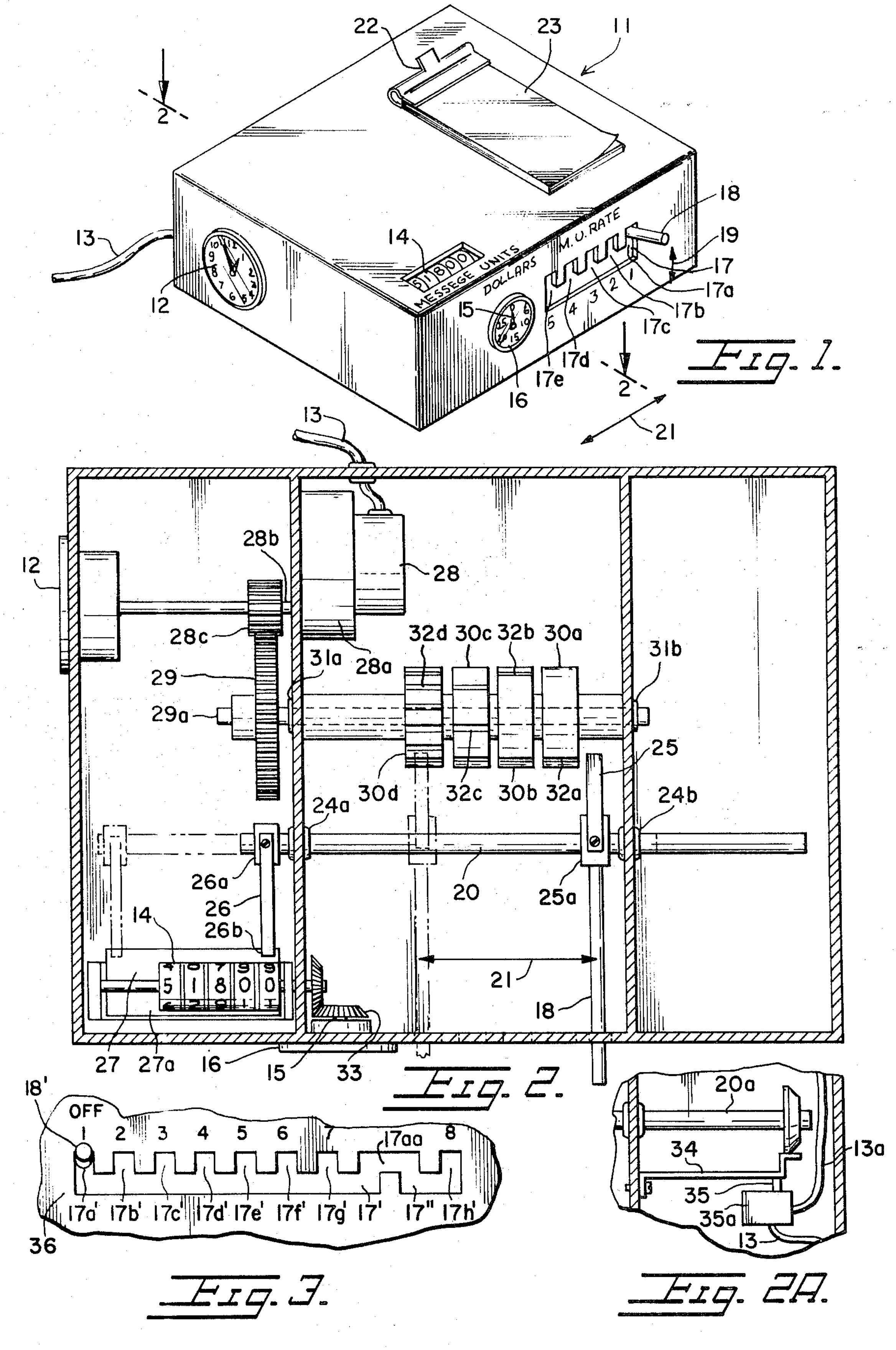
FIG. 1 illustrates in frontal perspective view a typical preferred embodiment of a message-unit computer of the present invention.
FIG. 2 illustrates a typical elevation plan view of the mechanism located below the upper casing of the embodiment of FIG. 1 as taken in cross-sectional view along line 2—2 of FIG. 1.
FIG. 2A illustrates an in-part elevation plan view of an alternate embodiment to that of FIG. 2.
FIG. 3 illustrates an in-part frontal view of an alternate selector track and lever.

FIG. 1 illustrates a typical message-units computer unit 11 of the present invention. This embodiment includes an electric clock 12, a power cord 13, a counter dial 14, a dollar indicator 15, an annular dollar chart sheet 16, and a variable selector slot 17 with selector sites 17*a*, 17*b*, 17*c*, 17*d*, and 17*e*. Slidable selector arm 18 is pivotably mounted at slide bar 20 for pivotably arced movement to and fro along arc 19 and for sliding lateral movement in directions indicated by line and arrows 21. Clip board clip 22 typically holds a writing pad or booklet 23. Counter 14 may include a reset button.

FIG. 2 illustrates a view taken along line 2—2 of FIG. 1. In the illustrated embodiment, arm 18 is fixedly mounted on slide shaft 20 such that when arm 18 is moved laterally in directions 21, the shaft 20 also moves axially in bearing surfaces 24*a* and 24*b*. In an alternate embodiment, the contactor arm 25, the contactor-arm mount 25*a*, and the arm 18 may be mounted on bearing surfaces for lateral sliding movement axially on an axially-stationary bar such as bar 20. Key 26 is substantially fixedly-mounted by key-mounting structure 26*a* onto slide bar 20 such that key end 26*b* when pressed downwardly acts on pivotably and spring-biased surface 27 of a mechanical counter to register either a downward movement of lever 18 or an upward movement of contactor arm 25, surface 27 being typically pivoted along edge 27*a*.

The embodiment of FIG. 2 illustrates additionally a constant-speed electric clock motor 28, clock mechanism 28*a*, constant-speed power shaft 28*b* and drive toothed-wheel 28*c*, meshing programmer-shaft wheel 29, programmer shaft 29*a*, and fixedly mounted programmed wheels 30*a*, 30*b*, 30*c*, and 30*d*. Shaft 29*a* is rotatably mounted in bearing surfaces 31*a* and 31*b*. For a model adapted to the New York City area, wheel 30*a* typically includes two notches 32*a*, while wheel 30*b* typically includes three notches 32*b*, and 30*c* includes typically six notches 32*c*, and 30*d* typically twelve notches 32*d*. Money registerer 15 is propelled by appropriate gears 33 of the counter 14.

FIG. 2A is an in-part view of an embodiment such as that illustrated in FIG. 2 except that the end of the shaft 20 designated 20*a* when moved laterally to the left relieves pressure against a biasing spring 34 against a key 35 of switch 35*a* for connecting cord 13 to the motor by the lead 13*a*, such a switch being utilizable normally in an embodiment in which the constant speed motor is not an electric clock motor.

FIG. 3 illustrates an in-part frontal view of an alternate typical selector panel 36 having a channel 17' and 17'' connected by 17*aa*, and separate sites 17*a'*, 17*b'*, 17*c'*, 17*d'*, 17*e'*, 17*f'*, 17*g'*, and 17*h'*. As noted earlier, for lever 18, downward pressure on lever 18' causes one message unit to register, and accordingly release of the lever into channel 17*aa* followed by a second downward pressure carrying the lever 18' into channel 17'' enroute to site 17*h'* causes a second message unit to be registered, thereby accumulating two message units on the counter in the movement of the lever 18' from the off site 17*a* ' identified as 1 to the on position of site 17*h'*, identified as 8 on the panel. This particular embodiment designed particularly for its adaptability for high accuracy for the Pacific Bell system, utilizes for the 8 sites, six programmed wheels as illustrated in FIGS. 3A through 3F; the one position not utilizing any programmed wheel, since for immediate vicinity local calls there is only a one unit charge which is registered by merely a downward pressure on the lever 18' without moving the lever sidewardly since there is no additional charge for an extended period of time during the completion of the call. The site 17*b'* identified as panel position 2 utilizes the programmed wheel of FIG. 3A having one notch, and similarly, the panel position 3 which is identified as site 17*c'* utilizes the two notch programmed wheel of FIG. 3B. The panel position 4 which is site 17*d'* utilizes the two wide-notch programmed wheel of FIG. 3C. The panel position 5 which is site 17*e'* utilizes a two notch programmed wheel more accurately described as a two-toothed wheel of FIG. 3D. The position 7 on the panel of site 17*g'* utilizes the programmed wheel of FIG. 3F, and the positions 6 and 8 corresponding to sites 17*f'* and 17*h'* utilized programmed wheels corresponding to that of FIG. 3E.

Figure 4:
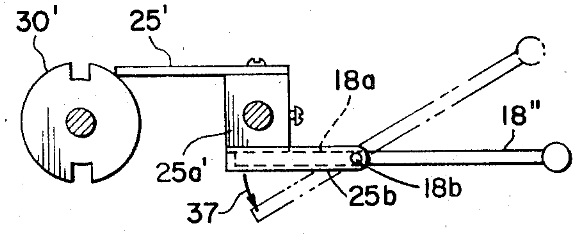
FIG. 4 illustrates a diagrammatic side view of selector arm, programmed wheel, and contactor arm of the type illustrated in FIG. 2.

FIG. 4 illustrates relative to a programmed wheel 30' a contactor arm 25' being supported by resting contact on the rounded surface of the programmed wheel 30', with the contactor arm mounted by mounting element 25*a'* which is attached to additional connecting mounting element 25*b* within which the inner end 18*a* of lever 18'' pivots along line 37 whenever the contactor 25' is resting on the rounded surface of the programmed wheel 30' if an upward lifting force is applied to the lever 18'', by virtue of the pivot 18*b*, thereby preventing breaking the lever or the contactor or the mounting element 25*a'*.

Figure 5A:
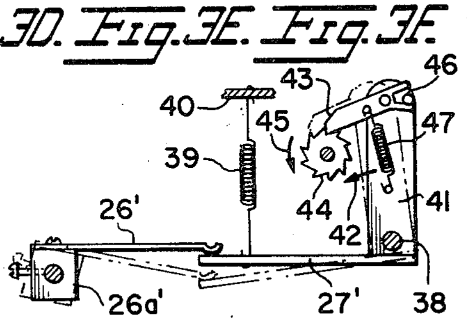
FIGS. 5A and 5B illustrate in diagrammatic side view alternate embodiments of counter actuation elements, for transmitting counter-action-signal motion from an actuator arm such as illustrated in FIG. 4, to a counter, typically a mechanical counter such as illustrated in FIG. 2.
Figure 5B:
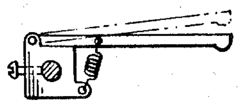

FIG. 5A illustrates partially structure analagous to that disclosed in FIG. 2, namely the key-mounting structure 26*a'*, the movement spring key 26', and spring biased surface 27' pivoted at pivot point 38. Biasing spring 39 is connected between plate 27' and a supporting structure 40. Movement of the counter actuation arm 41 in direction 42 causes the spring biased key 43 to push the toothed wheel 44 in direction 45, the key 46 preventing the key 43 from yielding when pressed against the tooth of toothed wheel 44, but the spring 47 permitting the pivoted key 43 to be withdrawn by action of spring 39 to its initial starting position and serving to pull the key 43 back into its orientation to lock behind a next occurring tooth of toothed wheel 44.

FIG. 58B shows an alternate of spring biased movement key 26' of non-spring material.

Figure 6A:
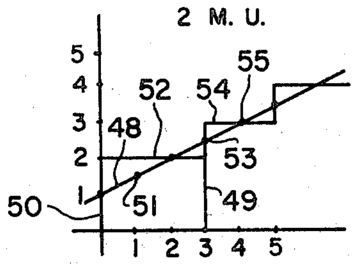
FIGS. 6A through 6C illustrate three different existing message-units charge charts of existing rates utilized by the Pacific Bell Telephone Company, each illustrating additionally superimposed thereon, the "average" charge registerable by a typical message-unit computer embodiment of the present invention.
Figure 6B:
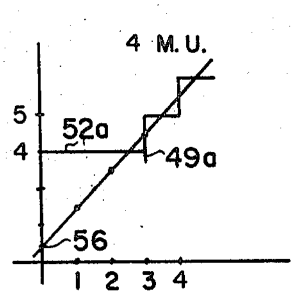
Figure 6C:
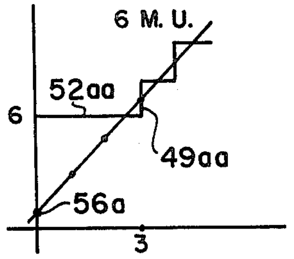

FIGS. 6A, 6B, and 6C illustrate representative graphics of the rates charged in terms of telephone message units at different distances within the local telephone vicinity of dialing. FIG. 6A illustrates an initial charge of two message units for the first three minutes and thereafter at the beginning of each additional two minutes an additional one message unit charge. For example in FIG. 6A, initially there is immediately a two message unit charge and thereafter a message unit is added at a rate of one message unit per additional two minutes. On the chart, it is seen that by the present computer device, an initial insert of one message unit is represented by line 48 extending for a period of up to three minutes indicated by line 49. However the constant rate motor has begun causing the programmed computer wheel to begin registering with the contactor arm at the time of the initial input indicated by line 50 whereby the total number of registered message units on the counter for a particular call at 3 minutes is 2½ message units. On the average at 1 minute into a telephone call, the present computer is one-half message unit below actual value charged at line 52, 51 of line 48, whereas just immediately prior to reaching the three minute mark, there is an overcharge of one-half message unit but at the 3 minute mark there is an under-charge of one-half message unit at point 53 as compared to line 54. At the 4 minute point, at point 55 there is complete accuracy of three message units charged whereas at the five minute point by the present computer there is again a one-half message unit under-charge. At the initial input of one message unit at line 50 there is an initial error of minus one message unit below the number of message units actually charged by the telephone company, i.e., two message units. However, as seen from the preceding discussion and by reference to the chart of FIG. 6A, that error is quickly reduced to a maximum of plus or minus 0.5 message units at any particular time. These individual call errors on the counter are 0, (±)1, etc., on an average.

FIG. 6B illustrates a situation where the telephone company under the Pacific Bell System puts in an initial four message unit and at the beginning of every minute thereafter charges an additional message unit, the initial four message units being represented by line **52*a* up to the three minute point of line 49*a*. By the present computer, initial input of one and one half units at point 56 brings about an initial error as compared to line 52*a* of 2½ message units. After the three minute point, as indicated by line 49*a***, again the maximum error is plus or minus one-half message unit thereafter for telephone calls extended beyond the 3 minute point.

FIG. 6C illustrates still a more distant "local" call chart in which the initial charge for the first three minutes is six message units as indicated by line **52*aa* whereby with a computer input of one message unit at 56*a*, there is an initial error of five message units, but at the 3 minute point as indicated by line 49*aa***, there is a mere one-half message unit error.

Figures 7A, 7B:
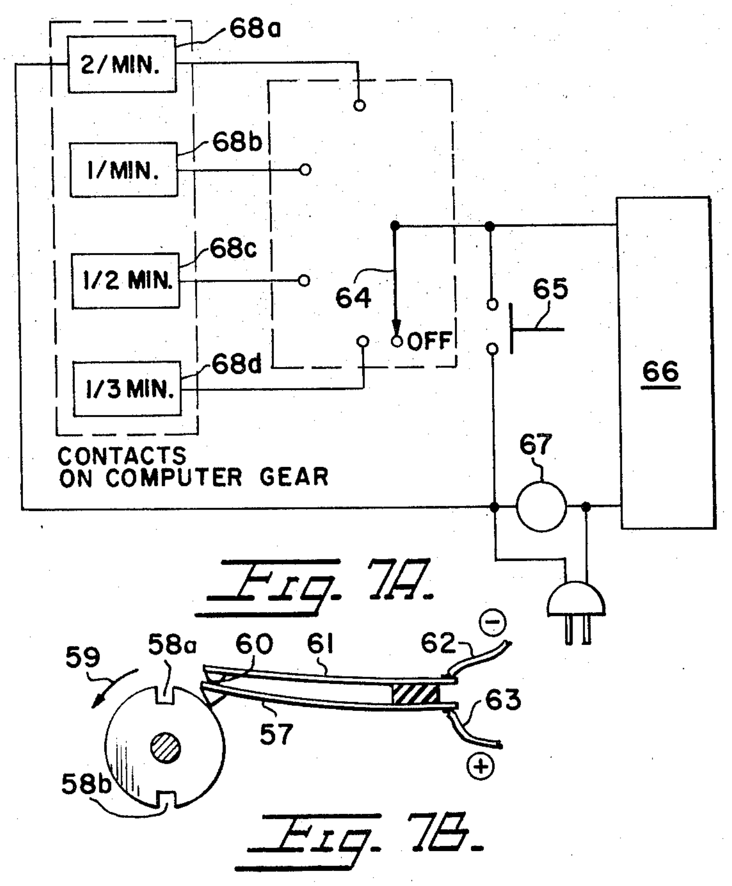
FIG. 7A illustrates a diagrammatic representation of an alternate embodiment basically similar to that of FIG. 2, except for the substitution herein of electrical contacts on the contactor arm operative with the programmed wheel notches, together with an electric counter and reset in circuit with the contacts.
FIG. 7B illustrates a diagrammatic side view of a typical arm and programmed wheel of FIG. 7A.

FIG. 7A illustrates graphically an electrical circuit utilizable with the programmed wheels such as illustrated in FIG. 2, except that the contactor arm carries with it a mechanism embodying the circuit of this figure.

FIG. 7B illustrates a typical contactor arm for making and breaking electrical circuits of FIG. 7A as the contactor arm rides along the rounded surface of the typical programmed wheel. As the contactor lower arm 57 slides into a slot **58*a* or 58*b*, during the rotation in direction 59, the contact 60 of arm 61 breaks its electrical contact with arm 57, thereby leads 62 and 63 are broken. In FIG. 7A, switch 64 may be either a rotary switch or a slide switch. Switch 65 represents a push button switch. Block 66 represents an electrical counter with a reset dial. Configuration 67 represents a clock. Block 68*a* 68*b*, 68*c*, 68*d* represent separate programmed wheels such as illustrated in FIG. 7B in combination with the respective contactor arm 57 and electrical circuit arm 61, discussed above. The model of FIGS. 7A and 7B is an accurate and good embodiment but is more expensive than typically the embodiment of FIG. 2. Also, the 120 volt wires would require a U.L. approval, and the embodiment would be more noisy than that of the FIG. 2** embodiment.

Figure 8:
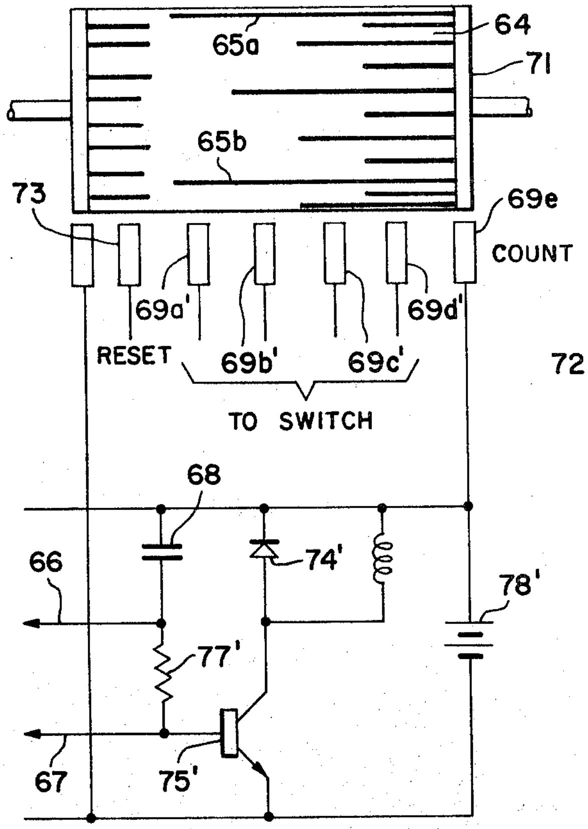
FIG. 8 illustrates a diagrammatic electronic circuit of an alternate electronic embodiment of the present invention.

FIG. 8 illustrates an alternative improved electronic model in which in a programmed rotary shaft the bars running axially of the shaft with which a contactor bar electrical contact makes contact to complete circuit during the rotary motion of the shaft 64, the typical contactor bars being **65*a* and 65*b* are recessed within the rounded surface. Additionally there are reset and counter buttons separate from the regular contactor arm switches. Lead 66 goes to count fingers by way of a selector switch and lead 67** goes to a reset finger. Typically the battery is a six volt battery power source.

Figure 9:
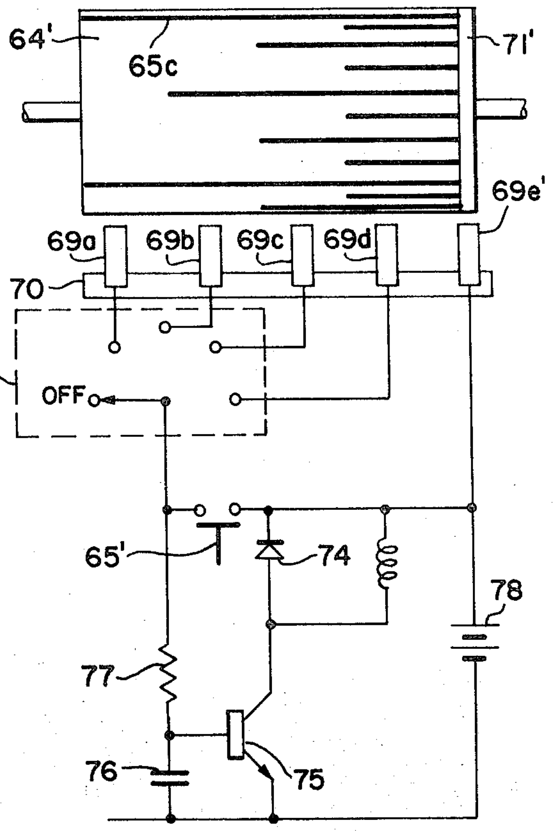
FIG. 9 illustrates a diagrammatic view of a second alternate electronic embodiment of the present invention.

FIG. 9 illustrates an additional improved electronic model basically similar to that of FIG. 8, represented in graphic form. As in the preceding FIG. 8, the electric fingers **69*a*, 69*b*, 69*c*, and 69*d*, are mounted on insulation 70 and the conducting bars 65*c* are embedded within the cylinder 64'. Similar to the interconnecting conducting ridge 71 of FIG. 8, FIG. 9 has interconnecting conductor ridge 71'. Typically the cylinder or shaft 64' is a plastic drum and typically the conducting surface 71' is annular, circumscribing the end of the drum. Fingers 69*e'* and the contact thereof make contact with the conducting surface 71'. This embodiment illustrates also the switch in box 72 of the type utilized in the electronic model of FIG. 8. The box 72** switch has additional positions (not shown) to provide the proper initial constant.

As in FIG. 8 the power source is typically a 6 volt battery. As in FIG. 7A, there is typically a push button 65' for registering one message unit.

For each of FIGS. 8 and 9, the parts are identified as the FIG. 8 fingers **69*a'*, 69*b'*, 69*c'*, and 69*d'*, as well as the protection diode 74 and 74', the drive transistor 75 and 75', the filter capacitor 76, the resistor 77 and 77' and the power source 78 and 78'**.

Figure 10:
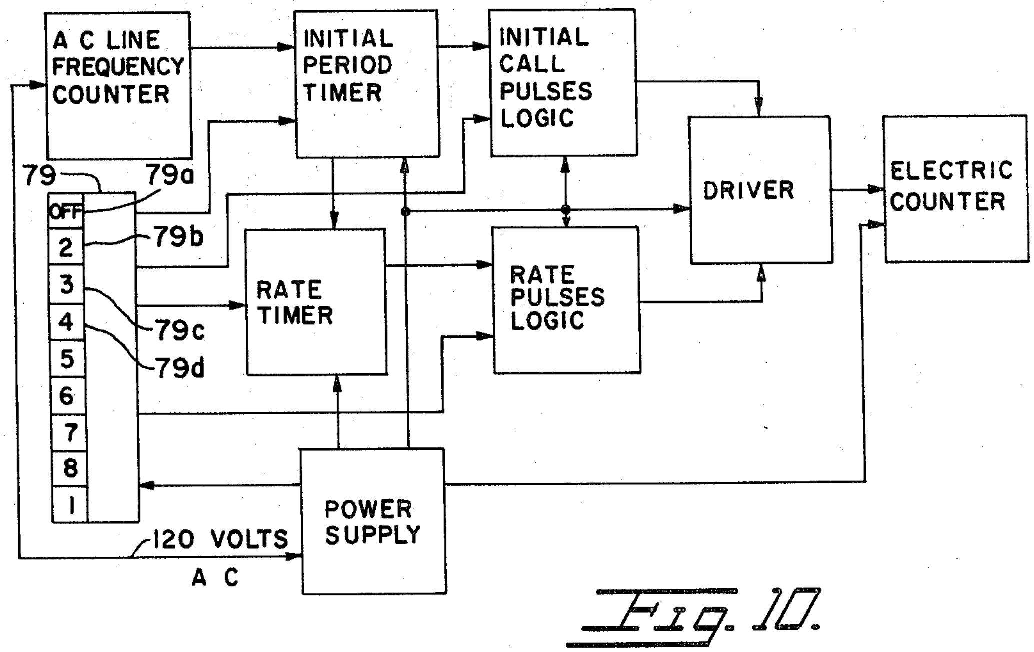
FIG. 10 illustrates a block-diagrammatic flow-chart view of an alternate larger-scale electronic computer system of the present invention.

FIG. 10 illustrates a block diagram of an electronic computer model embodying the present invention including push-button switches 79 having individual push-button selectors **79*a*, *b*, *c***. The blocks are appropriately labeled. As to the operation of the computer of FIG. 10, at the start of a call, the operator pushes the message unit push button, thereafter the initial period timer times the call and the initial call pulse logic gives the driver the proper number of pulses and shuts off. The driver pulses turn the counter. The rate timer is activated after the initial period and the rate pulse logic sends pulses to the driver which pulses the counter. After the call is complete, the system is shut off. Although the system of FIG. 10 is easily built by an logic engineer, the cost is prohibitive of such a system on a small scale such as would be utilized by a small business or in a home.

In the Pacific Bell system, and also in Suffolk, except that the eighth position is not needed, there are eight separate selector positions including the position labeled as the off position. The off position being the one selector position in some instances but possibly the number two site being numbered as the number one position, nevertheless the off site inserts one message unit by depressing the lever. Accordingly, the approximation by this computer is one message unit for the first three minutes and in fact that is exactly the number of message units charged by the Pacific Bell system, whereby there is no initial error, there being no overtime charge.

Figure 3A:
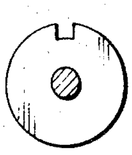
FIGS. 3A through 3F illustrate side views of typical programmed wheels for differing message-unit rates, of a preferred embodiment, mountable on a common shaft of constant rate rotation.
Figure 3B:
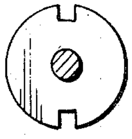
Figure 3C:
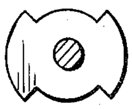
Figure 3D:
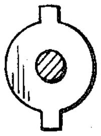
Figure 3E:
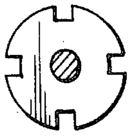
Figure 3F:
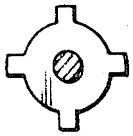

Referring back to the FIGS. 3A through 3F, note should be made to the different widths of the respective notches and/or teeth of programmed wheels such as typically that of FIG. 3C and 3D, which in some respects is analagous to separate plurality of notches such as in FIGS. 3B, 3E, and 3F. In particular, in a figure such as 3A, that programmed wheel having one notch has a probability of one-twentyfourth that when the variable selector arm is aligned with this particular programmed wheel, that the contactor arm will hit within the groove at the time of initial alignment of the contactor arm with this particular programmed wheel. In the FIG. 3B embodiment, that probability is increased to about two-twentyfourths that the contactor arm at the time of initial alignment will hit within one of the two grooves. In the FIG. 3C embodiment, clearly the probability of the contactor arm at the initial time of alignment thereof with this particular programmed wheel is substantially greater than the mere two-twentyfourths of the FIG. 3B embodiment, and similarly, the programmed wheel of FIG. 3D is much greater than that of the FIG. 3C. Likewise, the probability of the contactor arm hitting a notch at the moment of initial alignment for the FIG. 3E having four notches is clearly different than that of any of the preceding programmed wheels, and is programmed in order to reduce the error of approximation of the total message units at any one time to a minimum for any particular rate.

Typically for the Pacific Bell system which is also identical to the Suffolk system except for there being eight selector sites for Pacific Bell and only seven for Suffolk, the message unit positions give the following approximation by the present invention's computer as compared to also the below noted actual use, resulting in the above-noted degree of error in message unit terms; for the number one message unit site for the lever position the present inventive computer approximates one, whereas the actual use is one, resulting in a zero error. For lever position two, the approximation is one message unit plus the time times one half, whereas the actual use is one message unit plus the time times one-half, resulting in zero error. For the next two sites —i.e., sites three and four, the approximation respectively is one and one and one-half, whereas the actual use is one-half, and one and one-half message unit, the error being plus one-half for a number three site and zero for number four site. For the number five site, the approximation is two message units whereas the actual use is two and one half message units, there being an error minus one-half message units. For the number six lever site there is an approximation of one message unit, whereas the actual use is one message unit, resulting in zero error. For the number seven lever site, the approximation is two message units and the use is two message units, there being zero error. For the number eight site, the approximation is three message units and the use is three message units, there being no error.

For the Nassau and New York City telephone systems, the error is as follows. For the number one lever site, two message units per five minutes results in 0.17 error. For the number two site, three message units results in zero message unit initial error. For the number three position, four message units result in zero message unit error. For the five message unit position, the error is MINUS one-half message units. For the six message unit position, there is an error of PLUS one-half message units. For the seven message unit position, there is error zero.

For the particular programmed model illustrated in FIG. 2, except for example with eight positions, such as illustrated in FIG. 3, for the Pacific Bell model the number one site has precisely zero error where merely a pushing down of the lever is required to register one message unit, the number two site has an error of plus 0.04, the number three position or site has an error of plus 0.58, the number four site has an error of zero, the number five site has an error of minus 0.58, the number six site has an error of plus 0.16, the number seven position has an error of minus 0.16 and number eight site has an error of plus 0.16.

For a programmed wheel having one notch, the constant is one plus one-twentyfourth, which equals 1.04. For a programmed wheel having a notch extending all the way around except for a single tooth, the constant is 1.96. For a programmed wheel having two notches, with one on each of opposite sides, the constant is one plus 2/24, which equals 1.08 for the notch variety, 1.92 for the tooth variety and 1.5 for the wide notch. These three programmed wheels corresponding for example to the FIGS. 3B, 3C, and 3D. The FIG. 3F has a constant of 1.16, whereas the tooth variety of FIG. 3F has a constant of 1.84, these constants representing the probability of the connector arm dropping into the slot at the time of initial alignment with the particular programmed wheel.

The simple electric model embodiment of the present invention uses a contact or micro switch connected to every gear on the computer gear assembly. Selection of rates is accomplished by a rotary switch or push button assembly. The counter operates from typically a 120 volt A.C. power source.

The simple electric-electronic model of the present invention utilizes typically a 120 volt A.C. motor, but the contacts are connected to a battery and the counter is driven by transistors, this thereby increasing safety and eliminating contact deterioration. In a typical operation of the message unit computer such as that of FIG. 2, for example, for a one message unit call, the lever is pressed and let go, the handle thereby returning under pressure from the key spring and the counter spring. One unit is added to the count. For a two message unit call, the operator of the computer depresses the lever and slides the lever over to normally the first slot which slot represents the two message unit position, the handle is then let go whereby the lever jumps automatically partially upwardly into the casing slot and stays there until removed at the end of the telephone call.

There are possible variations on the various parts and components illustrated and the overall combinations as would be apparent to a person of ordinary skill. For example there may be two separate counters, one utilized for the individual call, while another is utilized for a cumulative total over an extended period of a plurality of calls. For non-clock models, a wheel held by spring pressure may be added to give time in minutes, this wheel typically being geared but being held only by spring pressure and being thereby resettable easily. The message unit computer of the present invention although specifically designed to be advantageously utilized with various telephone company billing systems, may nevertheless be utilized for other purposes such as the timing of cooking processes, industrial processes where a digital counter is desired, or merely a teaching machine to teach basic counting and timing. A digital counter for an industrial process, the motor would be replaced with an outward shaft typically. This particular machine should give the average user accuracy better than 95 percent overall. The accuracy of the machine is based on short calls of approximately 2 minutes or longer. For calls of lesser duration, there is less accuracy, the longer the calls, the greater the accuracy being.

It should also be noted that although not illustrated, the counter may be mounted at the telephone and the computer may be mounted in the telephone or outside of the telephone, particularly for example, the computer itself being mounted in a central telephone office billing computer center, connecting the central billing computer to a plurality of different telephones by conventional telephone wiring. Such a system would require an electric counter which is tuned to an acceptable frequency or tuned electronic circuits. After each call (or during the call) the computer will pulse the counter. Reset would be accomplished once a month by a reset coil tuned to a different frequency.

It is to be noted that if and when the telephone companies initiate time billing of one message unit calls, the computer will be so adjusted.

There will be various models conforming to the billing methods of all the telephone companies including those that bill in terms of cents per minute instead of message units.

It is within the scope of the present invention to use obvious equivalents and modifications.

I claim:

1. A consumer telephone message-unit calculating device comprising in combination: a constant-rate computer means for intermittent use with consecutive telephone calls having a predetermined plurality of different-rate message-units positions for initiating message unit signals each indicative of a predetermined number of message units corresponding to that particular signal programmed for a predetermined time period; variable message unit-selector means for providing separate selection of any of several message unit-positions each corresponding to one predetermined position of said plurality and for initiating said signal to add-in a predetermined constant for said one position, there being a separate predetermined constant for each of said plurality; and a message unit cumulative-totaling means connected for receiving and totaling said signals; said combination being such that counted-cumulative signals for any combination of the rate positions over a period of time for a plurality of said uses approximates total message unit charges by a telephone company, said computer means including a constant rate electrical motor, and at least one revolvable programmed element having separate programmed positions corresponding to said plurality also being included, said means for initiating said add-in-constant signal comprising a biasing spring, a pivoted lever biased by said spring, and a mechanical connector operatively connected to said lever to cause said counter means to register one said signal when said lever is moved against biasing tension of said spring, said means for providing separate selection comprising a sliding element operatively connected to said lever such that said lever is slidable sidewardly to align said connector with any one of said separate positions, said programmed element at any one of said separate positions being substantially cylindrical in shape and rotatable and having a circumscribing rounded surface, as a wheel around a longitudinal axis of said cylindrical element and having spaced along and in said surface a predetermined number of contact means for initiating said signals, said contact means including at least one slot where there are a plurality of said slots, the plurality being spaced around said circumscribing surface, and said connector when aligned being ridable on said surface and movable into and outof said slot and said plurality of slots whenever said revolvable element is revolvably rotated by said motor, said slot taking-up an area equal to about one twenty-fourth on said circumscribing rounded surface, said constant rate motor rotating said surface at a rate of about one revolution for each 2 to 6 minutes, and said revolvable element having at least four of said separate positions and said slidable lever having at least five alternately selectable sites, a first site corresponding to at least one non-aligned position for said initiating said add-in-constant signal, and the remainder of the five sites corresponding to respective ones of aligned selectable sites.

2. A device of claim 1, including a switch for actuation and deactivation of said computer means.

3. A device of claim 1, in which each of said slots and said connector includes an electrical contact connected such that the making of said contacts between a slot and the connector serves to initiate said signal.

4. A device of claim 3, including a time indicator connected to said constant rate electrical motor, and including a cumulative money-bill indicator operatively connected to said computer.

* * * * *